(12) United States Patent
Han

(10) Patent No.: US 10,235,185 B2
(45) Date of Patent: Mar. 19, 2019

(54) COMPUTER AND CONTROLLING METHOD THEREOF

(71) Applicants: INVENTEC (PUDONG) TECHNOLOGY CORPORATION, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 317 days.

(21) Appl. No.: 15/197,665

(22) Filed: Jun. 29, 2016

(65) Prior Publication Data
US 2017/0337066 A1  Nov. 23, 2017

(30) Foreign Application Priority Data

May 20, 2016  (CN) .......................... 2016 1 0338963

(51) Int. Cl.
*G06F 9/4401* (2018.01)
*G06F 1/24* (2006.01)

(52) U.S. Cl.
CPC ................ *G06F 9/441* (2013.01); *G06F 1/24* (2013.01); *G06F 9/4403* (2013.01)

(58) Field of Classification Search
CPC . H03K 19/0013; G06F 3/0679; G06F 21/575; G06F 9/45558; G06F 2221/034; G06F 3/0619; G06F 1/24; G06F 11/1441; G06F 21/572; G01R 31/31701
See application file for complete search history.

(56) References Cited

U.S. PATENT DOCUMENTS

| | | | | |
|---|---|---|---|---|
| 7,154,297 | B1 * | 12/2006 | Camarota | H03K 19/1776 326/40 |
| 2002/0048184 | A1 * | 4/2002 | Kang | G11C 11/22 365/145 |
| 2014/0025989 | A1 * | 1/2014 | Tanaka | G06F 11/2028 714/6.1 |

* cited by examiner

*Primary Examiner* — Jaweed A Abbaszadeh
*Assistant Examiner* — Alyaa T Mazyad
(74) *Attorney, Agent, or Firm* — Maschoff Brennan

(57) ABSTRACT

A computer has a platform controller hub (PCH), a field replaceable unit (FRU), a memory, a complex programmable logic device (CPLD) and a basic input output system (BIOS) chip. The PCH has a first port and a second port. The FRU and the memory are both electrically connected to the first port of the PCH. The CPLD is electrically connected to the second port of the PCH, and used for detecting an indicating signal from the second port to selectively generate a reset signal. The BIOS chip is electrically connected to the PCH, the FRU, and the CPLD, and used for making the computer rebooted in a manufacturer mode or a normal mode according to the reset signal.

14 Claims, 2 Drawing Sheets

COMPUTER AND CONTROLLING METHOD THEREOF

CROSS REFERENCE

The present application is based on and claims priority from China Application Serial Number 201610338963.1, filed on May 20, 2016, the invention of which is hereby incorporated by reference herein in its entirety.

TECHNICAL FIELD

The invention is related to a computer and controlling method thereof, and particularly to a computer with two operation modes and the controlling method thereof.

BACKGROUND

A server type computer typically has a baseboard management controller (BMC) to manage the signal paths between the units on the motherboard.

For the convenience of maintenance of the server, the BMC is embedded with the version information so as to manage the signal paths. However, certain signal paths may suffer from read/write conflict when a server does not have a BMC.

SUMMARY

The invention is to provide a computer without the baseboard management controller and a controlling method thereof capable of get rid of the reading/writing conflict.

According to one embodiment of the invention, the computer has a platform controller hub (PCH), a field replaceable unit (FRU), a memory, a complex programmable logic device (CPLD) and a basic input output system (BIOS) chip. The PCH has a first port and a second port. The FRU and the memory are both electrically connected to the first port of the PCH. The CPLD is electrically connected to the second port of the PCH, and used for detecting an indicating signal from the second port to selectively generate a reset signal. The BIOS chip is electrically connected to the PCH, the FRU, and the CPLD, and used for selectively making the computer rebooted in a manufacturer mode or a normal mode according to the reset signal. In the manufacturer mode, the BIOS chip makes the memory inaccessible to the PCH and the FRU accessible to the PCH.

According to one embodiment of the invention, the controlling method applicable for a computer includes the steps below: In a normal mode, when the platform controller hub (PCH) receives a writing request, the PCH generates an indicating signal. When the complex programmable logic device (CPLD) detects the indicating signal, the CPLD generates a reset signal. When the computer is rebooted, a basic input output system chip makes the computer to start in a manufacturer mode according to the reset signal. In the manufacturer mode, the field replaceable unit is accessible to the PCH and the memory is inaccessible to the PCH.

As above, the computer and the controlling method thereof according to the invention is capable of preventing the computer from the reading/writing conflict by adjusting the accessibility of certain elements to the PCH.

In order to make the aforementioned and other features of the present invention more comprehensible, several embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
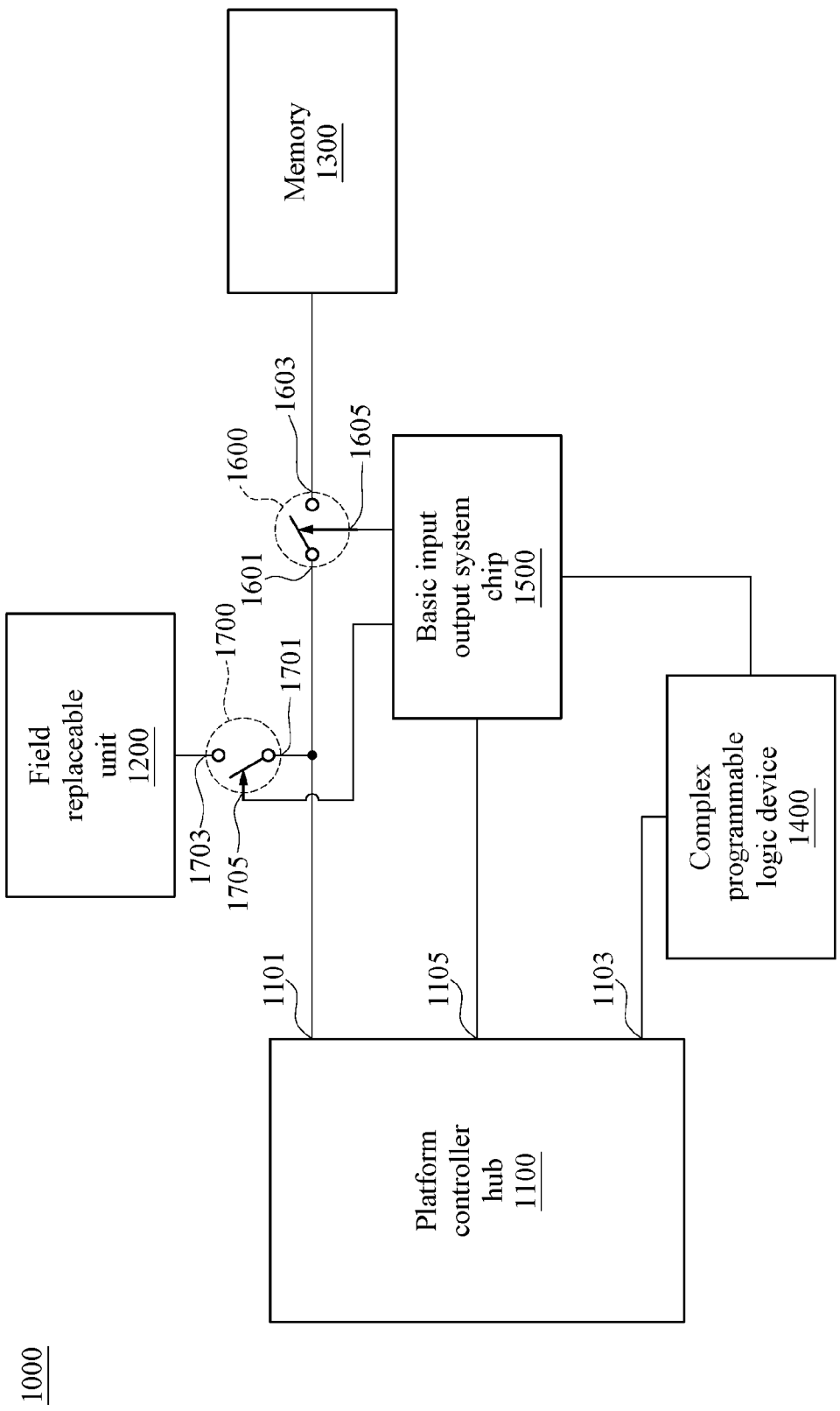
FIG. 1 is architecture of a computer according to one embodiment of the invention.

Please refer to FIG. 1 which is architecture of a computer according to one embodiment of the invention. As shown in FIG. 1, the computer 1000 according to one embodiment of the invention includes a platform controller hub (PCH) 1100, a field replaceable unit (FRU) 1200, a memory 1300, a complex programmable logic device (CPLD) 1400, and a basic input output system (BIOS) chip 150. The PCH has a first port 1101 and a second port 1103. The FRU 1200 and the memory 1300 are both electrically connected to the first port 1101 of the PCH 1100. The CPLD 1400 is electrically connected to the second port 1103 of the PCH 1100. The BIOS chip 1500 is electrically connected to the PCH 1100, the FRU 1200, and the CPLD 1400. In certain embodiments, the first port 1101 and the second port 1103 are both pins of the PCH 1100.

The CPLD 1400 is used for detecting an indicating signal $V_{ind}$ outputted from the second port 1103 of the PCH 1100 so as to selectively generate a reset signal $V_{res}$. The BIOS chip 1500 selectively makes the computer 1000 reboot in a manufacturer mode or a normal mode according to the reset signal $V_{res}$. In the manufacturer mode, the BIOS chip 1500 makes the memory 1300 inaccessible to the PCH 1100 and makes the FRU 1200 accessible to the PCH. In the normal mode, the BIOS chip 1500 makes the FRU 1200 inaccessible to the PCH 1100 and makes the memory 1300 accessible to the PCH 1100.

In one embodiment, as shown in FIG. 1, the computer 1000 further has a first switch 1600 which is respectively electrically connected to the BIOS chip 1500, the memory 1300, and the first port 1101 of the PCH 1100. The first switch 1600 is controlled by the BIOS chip 1500 so as to determine whether a signal path between the first port 1101 of the PCH 1100 and the memory 1300 is conducted or not. Specifically, when the computer 1000 is in the manufacturer mode, the first switch 1600 is in the OFF state, so the signal path is not conducted and the PCH 1100 cannot access the memory 1300. When the computer 1000 is in the normal mode, the first switch 1600 is in the ON state, so the signal path is conducted and the PCH 1100 can access the memory 1300. Practically, the first switch 1600 has a first terminal of the first switch 1601, a second terminal of the first switch 1603, and a control terminal of the first switch 1605. The first terminal of the first switch 1601 is electrically connected to the first port 1101 of the PCH 1100. The second terminal of the first switch 1603 is electrically connected to the memory 1300. The control terminal of the first switch 1605 is electrically connected to the BIOS chip 1500. In one embodiment, the BIOS chip 1500 is electrically connected to the control terminal of the first switch 1605 via the PCH 1100.

In one embodiment, as shown in FIG. 1, the computer 1000 further has a second switch 1700 which is respectively electrically connected to the BIOS chip 1500, the FRU 1200, and the first port 1101 of the PCH 1100. The second switch 1700 is controlled by the BIOS chip 1500 so as to determine whether a signal path between the first port 1101 of the PCH 1100 and the FRU 1200 is conducted or not. Specifically, when the computer 1000 is in the normal mode, the second switch 1700 is in the OFF state, so the signal path is not conducted and the PCH 1100 cannot access the FRU 1200. When the computer 1000 is in the manufacturer mode, the second switch 1700 is in the ON state, so the signal path is conducted and the PCH 1100 can access the FRU 1200. Practically, the second switch 1700 has a first terminal of the second switch 1701, a second terminal of the second switch 1703, and a control terminal of the second switch 1705. The first terminal of the second switch 1701 is electrically connected to the first port 1101 of the PCH 1100. The second terminal of the second switch 1703 is electrically connected to the FRU 1200. The control terminal of the second switch 1705 is electrically connected to the BIOS chip 1500. In one embodiment, the BIOS chip 1500 is electrically connected to the control terminal of the second switch 1705 via the PCH 1100. In one embodiment, the aforementioned first switch 1600 and the second switch 1700 is realized with a relay, a transistor switch or other equivalent electronic devices.

In one embodiment, when a user, via an operating system, sends a writing request for the FRU 1200 to the PCH 1100, the computer 1000 operates as depicted above so as to enter the manufacturer mode, and the PCH 1100 sends an indicating signal $V_{ind}$ by the second port 1103. In certain embodiments, the voltage at the second port 1103 is default high and the indicating signal $V_{ind}$ is generated by temporarily pulling down the voltage at the second port 1103. Hence, the CPLD 1400 is capable of detecting whether the indicating signal $V_{ind}$ is generated by the PCH 1100 by detecting the voltage at the second port 1103. When the CPLD 1400 receives the indicating signal $V_{ind}$, the CPLD 1400 generates the reset signal $V_{res}$.

When the BIOS chip 1500 receives the reset signal $V_{res}$ in the normal mode, the BIOS chip 1500 makes the computer 1000 rebooted in the manufacturer mode. When the BIOS chip 1500 receives the reset signal $V_{res}$ in the manufacturer mode, the BIOS chip 1500 makes the computer 1000 rebooted in the normal mode.

Figure 2:
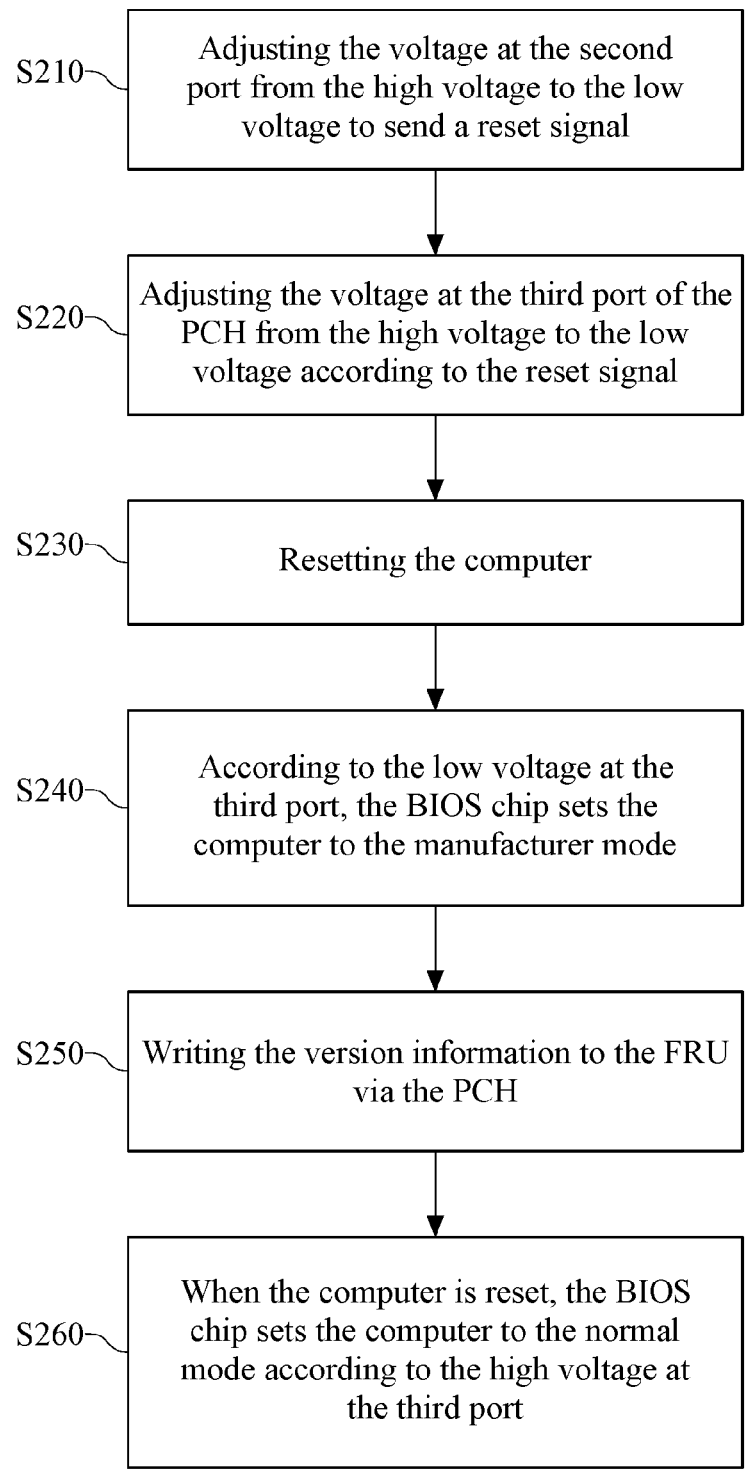
FIG. 2 is a flow chart of the controlling method for computer according to one embodiment of the invention.

Specifically, please refer to FIG. 2, which is a flow chart of the controlling method for computer according to one embodiment of the invention. As shown in FIG. 2, when the PCH 1100 receives a writing request for the FRU 1200, as shown in step S210, the PCH 1100 adjusts the voltage at the second port 1103 from the high voltage to the low voltage to send a reset signal $V_{res}$. Then, as shown in step S220, after the CPLD 1400 detects the change of the voltage at the second port 1103, the CPLD 1400 changes the voltage sent to the third port 1105 of the PCH 1100 from high to low. Hence, both of the BIOS chip 1500 and the PCH 1100 are informed that the computer 1000 is going to enter the manufacturer mode. After the BIOS chip 1500 detects the voltage change from high to low at the third port 1105 of the PCH, the computer 1000 is rebooted as shown in step S230. After rebooting, the system configurations in the BIOS chip 1500 are used for setting the status of each element in the computer. As shown in step 240, the BIOS chip 1500 sets the whole computer 1000 to the manufacturer mode because the BIOS chip 1500 detects that the voltage at the third port 1105 of the PCH 1100 is low. Then as shown in step S250, the manufacturer is capable of writing the version information of the computer 1000 or other necessary information into the FRU 1200 via the first port 1101 of the PCH 1100. The false writing is prevented because the memory 1300 is now inaccessible to the PCH 1100.

After the computer 1000 is rebooted, the CPLD 1400 pulls the voltage at the third port 1105 to the high voltage. Hence, after the manufacturer accomplishes the information writing in the step S250, the BIOS chip 1500 detects that the voltage at the third port 1105 is high when the computer 1000 is rebooted and accordingly set the computer 1000 to the normal mode, as shown in step S260. In the aforementioned, the manufacturer mode is for a manufacturer to write information into the computer 1000, and the normal mode is for normal use of the computer 1000.

Further, though the adjustment of the accessibility of both of the FRU 1200 and the memory 1300 is realized by the first switch 1600 and the second switch 1700 in the above embodiments, the BIOS chip 1500 enables/disables the FRU 1200 or the memory 1300 to realize the adjustment in another embodiment. In yet another embodiment, the BIOS chip 1500 sets the PCH 1100 so that one of the FRU 1200 and the memory 1300 is inaccessible to the PCH 1100. However, the invention is not tend to limit the method of the adjustment of the accessibility of each of the FRU 1200 and the memory 1300.

As above, with the computer and the controlling method thereof according to one embodiment of the invention, the accessibility of certain elements is selectively adjusted by the switch of the modes without the baseboard management controller, and the reading/writing conflict is therefore prevented.

What is claimed is:

1. A computer, comprising:
   a platform controller hub (PCH) having a first port and a second port;
   a field replaceable unit (FRU) electrically connected to the first port of the platform controller hub;
   a memory electrically connected to the first port of the platform controller hub;
   a complex programmable logic device (CPLD) electrically connected to the second port of the platform controller hub and for detecting an indicating signal of the second port to selectively generate a reset signal; and
   a basic input output system (BIOS) chip electrically connected to the PCH, the FRU, and the CPLD, and for selectively make the computer to reboot in a manufacturer mode or a normal mode based on the reset signal;
   in the manufacturer mode, the BIOS chip makes the memory inaccessible to the PCH and makes the FRU accessible to the PCH.

2. The computer in claim 1, wherein when the computer is in the normal mode, the BIOS chip makes the FRU inaccessible to the PCH and makes the memory accessible to the PCH.

3. The computer in claim 1, further comprises a first switch respectively electrically connected to the BIOS chip, the memory, and the PCH, and the first switch is switched by the BIOS chip between an ON state and an OFF state to determine whether a path between the first port of the PCH and the memory is conducted.

4. The computer in claim 3, wherein when the computer is in the manufacturer mode, the first switch is in the OFF state.

5. The computer in claim 3, wherein when the computer is in the normal mode, the first switch is in the ON state.

6. The computer in claim 1, further comprises a second switch respectively electrically connected to the BIOS chip, the FRU, and the first port of the PCH, and the second switch is switched by the BIOS chip between an ON state and an OFF state to determine whether a path between the first port of the PCH and the FRU is conducted.

7. The computer in claim 6, wherein when the computer is in the manufacturer mode, the second switch is in the ON state.

8. The computer in claim 6, wherein when the computer is in the normal mode, the second switch is in the OFF state.

9. The computer in claim 1, wherein when the PCH receives a writing request for the FRU, the computer enters the manufacturer mode and the PCH sends the indicating signal via the second port.

10. The computer in claim 1, wherein a voltage at the second port is default high and the indicating signal is generated by temporarily pulling the voltage at the second port to low.

11. The computer in claim 1, wherein when the BIOS chip receives the reset signal in the normal mode, the BIOS chip makes the computer rebooted in the manufacturer mode.

12. The computer in claim 1, wherein when the BIOS chip receives the reset signal in the manufacturer mode, the BIOS chip makes the computer rebooted in the normal mode.

13. A controlling method applicable for a computer, the method comprises:
   in a normal mode, generating an indicating signal when a platform controller hub (PCH) receives a writing request;
   generating a reset signal when a complex programmable logic device (CPLD) detects the indicating signal; and
   when the computer is rebooted, a basic input output system (BIOS) chip makes the computer to start in a manufacturer mode;
   in the manufacture mode, a field replaceable unit (FRU) is accessible to the PCH and a memory is inaccessible to the PCH.

14. The method in claim 13, further comprising:
   in the manufacturer mode, the CPLD adjusts the reset signal; and
   when the computer is rebooted, the BIOS chip makes the computer started in the normal mode according to the adjusted reset signal;
   wherein in the manufacturer mode, the FRU is accessible to the PCH and the memory is inaccessible to the PCH.

* * * * *